United States Patent
Keezhuridathil et al.

(10) Patent No.: US 12,505,220 B2
(45) Date of Patent: Dec. 23, 2025

(54) APPARATUS AND METHOD FOR POLICY-BASED AUTOMATED EXCEPTION HANDLING

(71) Applicants: RAKUTEN MOBILE, INC., Tokyo (JP); Rakuten Symphony, Inc., Tokyo (JP)

(72) Inventors: Unnikrishnan Keezhuridathil, Indore (IN); Devendra Behera, Indore (IN); Ritesh Kumar Kalle, Tokyo (JP)

(73) Assignees: RAKUTEN SYMPHONY, INC., Tokyo (JP); RAKUTEN MOBILE, INC., Tokyo (JP)

( * ) Notice: Subject to any disclaimer, the term of this patent is extended or adjusted under 35 U.S.C. 154(b) by 312 days.

(21) Appl. No.: 17/916,883

(22) PCT Filed: Jul. 26, 2022

(86) PCT No.: PCT/US2022/038313
§ 371 (c)(1),
(2) Date: Oct. 4, 2022

(87) PCT Pub. No.: WO2024/025515
PCT Pub. Date: Feb. 1, 2024

(65) Prior Publication Data
US 2024/0386112 A1 Nov. 21, 2024

(51) Int. Cl.
*G06F 21/57* (2013.01)
*H04L 9/40* (2022.01)
*H04L 41/084* (2022.01)

(52) U.S. Cl.
CPC ...... *G06F 21/572* (2013.01); *G06F 2221/033* (2013.01); *H04L 41/0843* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,484,261 B1 * | 11/2002 | Wiegel | H04L 41/0893 715/967 |
| 2014/0007182 A1 * | 1/2014 | Qureshi | G06F 21/6218 726/1 |

(Continued)

FOREIGN PATENT DOCUMENTS

WO   WO-2018201863 A1 * 11/2018 ............ G06F 11/366

OTHER PUBLICATIONS

International Search Report dated Nov. 29, 2022 in International Application No. PCT/US 22/38313.

(Continued)

*Primary Examiner* — Philip J Chea
*Assistant Examiner* — Bin Qing Zheng
(74) *Attorney, Agent, or Firm* — Sughrue Mion, PLLC (57) ABSTRACT

To configure an application platform for policy-based automated exception handling, a plurality of policies are established, each defining a requirement for applications. A plurality of exceptions are also established, each defining an expiration time and indicating at least one of the policies. A processor automatically generates a configuration file associating each of the exceptions with each policy indicated in the exception. The processor then automatically configures the application platform according to the configuration file. As a result of this configuration, an admission controller of the platform selectively tests an application designated for deployment to the application platform, based on a determination whether an exception assigned to the application is presently applicable to the policy. The exception is presently applicable based on an association of the exception with the (Continued)

policy in the configuration file, and a comparison of a present time with the exception's expiration time.

17 Claims, 5 Drawing Sheets

(56) References Cited

U.S. PATENT DOCUMENTS

| | | | | |
|---|---|---|---|---|
| 2014/0130036 | A1* | 5/2014 | Gurikar | G06F 8/62 |
| | | | | 717/176 |
| 2015/0121155 | A1* | 4/2015 | Boshev | H04L 41/0893 |
| | | | | 714/48 |
| 2020/0120142 | A1* | 4/2020 | Maynard | G06Q 10/067 |
| 2022/0191248 | A1* | 6/2022 | Pieczul | H04L 63/0227 |

OTHER PUBLICATIONS

Written Opinion of the International Searching Authority dated Nov. 29, 2022 in International Application No. PCT/US 22/38313.

* cited by examiner

APPARATUS AND METHOD FOR POLICY-BASED AUTOMATED EXCEPTION HANDLING

CROSS REFERENCE TO RELATED APPLICATIONS

This application is a National Stage of International Application No. PCT/US2022/038313 filed Jul. 26, 2022.

BACKGROUND

1. Field

Apparatuses and methods consistent with example embodiments relate to management of policies for enforcement against applications to be deployed on an application platform, and more particularly, to the automated configuration and handling of exceptions to the policies.

2. Description of Related Art

In cloud native application platforms (such as Kubernetes), an application can be uploaded, onboarded, and deployed onto clusters on the platform. The application can then be accessed and operated by users across a network.

During this process, security policies are preferably enforced or otherwise applied automatically as a safety measure, to ensure neither the platform nor its users could be harmed by installation or use of the application. Other constraining policies may also be applied for reasons other than security. Each policy defines a requirement or constraint against which the application is tested.

An application which fails to meet a given policy can have various automatic responses applied thereto, depending on the importance of the policy. Failure to meet particularly important policies typically result in rejection of the deployment request entirely, while less crucial policies may only require flagging a failing application for later review and/or restricting the contexts in which the application can be used, and purely optional policies might merely present an alert to the uploading party.

As such, every object creation request in the cluster can be authenticated, authorized, and validated to enforce the organization's standards.

SUMMARY

It is an object of the disclosed system and method to automatically configure exceptions to policies normally applied during the deployment of applications.

It is another object of the disclosed system and method to automatically and promptly respond to the expiration of a temporary exception to policies.

In accordance with certain embodiments of the present disclosure, a method is provided for configuring an application platform for policy-based automated exception handling. The method includes establishing a plurality of policies each to define a requirement for an application. The method further includes establishing a plurality of exceptions each to define an expiration time and to indicate at least one policy of the plurality of policies. The method further includes, by a processor, automatically generating a configuration file associating each exception of the plurality of exceptions with each policy indicated in the exception. The method further includes, by the processor, automatically configuring the application platform according to the configuration file. According to the configuration, the admission controller of the application platform selectively tests an application designated for deployment to the application platform and having an exception assigned thereto, based on a determination whether the assigned exception is presently applicable to the policy. The testing is to determine whether the application meets a requirement defined by a policy in the configuration file. An exception is determined to be presently applicable to the policy based on an association of the exception with the policy in the configuration file, and a comparison of a present time with the expiration time defined in the exception. According to the configuration, the admission controller of the application platform also selectively executes an automated response based on a failure of the application to fulfill the requirement upon testing.

In accordance with other embodiments of the present disclosure, a non-transitory computer-readable recording medium is provided. The recording medium has recorded thereon instructions executable by at least one processor to perform a method for configuring an application platform for policy-based automated exception handling. The method includes establishing a plurality of policies each to define a requirement for an application. The method further includes establishing a plurality of exceptions each to define an expiration time and to indicate at least one policy of the plurality of policies. The method further includes, by a processor, automatically generating a configuration file associating each exception of the plurality of exceptions with each policy indicated in the exception. The method further includes, by the processor, automatically configuring the application platform according to the configuration file. According to the configuration, the admission controller of the application platform selectively tests an application designated for deployment to the application platform and having an exception assigned thereto, based on a determination whether the assigned exception is presently applicable to the policy. The testing is to determine whether the application meets a requirement defined by a policy in the configuration file. An exception is determined to be presently applicable to the policy based on an association of the exception with the policy in the configuration file, and a comparison of a present time with the expiration time defined in the exception. According to the configuration, the admission controller of the application platform also selectively executes an automated response based on a failure of the application to fulfill the requirement upon testing.

In accordance with still other embodiments of the present disclosure, an electronic device is provided. The electronic device includes at least one memory configured to store computer program code. The electronic device further includes at least one processor configured to operate as instructed by the computer program code. The computer program code includes policy code configured to cause at least one of the at least one processor to establish a plurality of policies each to define a requirement for an application. The computer program code further includes exception code configured to cause at least one of the at least one processor to establish a plurality of exceptions each to define an expiration time and to indicate at least one policy of the plurality of policies. The computer program code further includes generation code configured to cause at least one of the at least one processor to automatically generate a configuration file associating each exception of the plurality of exceptions with each policy indicated in the exception. The computer program code further includes configuration code configured to cause at least one of the at least one processor to automatically configure the application platform according to the configuration file. According to the configuration resulting from the configuration code, the admission controller of the application platform selectively tests an application designated for deployment to the application platform and having an exception assigned thereto, based on a determination whether the assigned exception is presently applicable to the policy. The testing is to determine whether the application meets a requirement defined by a policy in the configuration file. An exception is determined to be presently applicable to the policy based on an association of the exception with the policy in the configuration file, and a comparison of a present time with the expiration time defined in the exception. According to the configuration resulting from the configuration code, the admission controller of the application platform also selectively executes an automated response based on a failure of the application to fulfill the requirement upon testing.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

It is noted that the principles disclosed herein are generally applicable to all forms of policies which place constraints on the features and qualities of applications being introduced to any software environment. Such policies can include but are not limited to constraints on type of application or general functionality (e.g. only games, only media players, only clients for a particular service, etc.), or even on style (e.g. only "kid-friendly" applications, etc.). Likewise, possible software environments can include but are not limited to application distribution services and Software As A Service (SaaS), Platform As A Service (PaaS), or Infrastructure As A Service (IaaS) "dashboards" and providers. However, throughout the disclosure, the policies being applied by the disclosed system and method will be primarily referred to as security policies, and the software environment will be primarily referred to as a cloud native application platform, for convenience and clarity purposes.

As described briefly in the Background, security policies or other policies can be automatically enforced as constraints on any application being uploaded to an application platform for deployment. For the purposes of this disclosure, the terms "constraint" and "policy" describe the same concept and will be used interchangeably herein.

Generally, constraints will be enforced equally against all such applications and all parties uploading applications. However, in certain cases, it can be desirable to provide a "grace period" or other temporary exception to some constraints for the applications uploaded by a particular party, or for some other set of applications. For example, a party which is new to the platform might need time to re-tool their applications to meet the standards of that platform. If the party is otherwise trustworthy (e.g. if it is a well-known and well-established company), the administrators of the platform might find it worth providing a temporary exception to one or more constraints, in order to establish a relationship between parties quickly and without hassle. This might especially be the case where the standard enforcement of the constraint would be to flag it for a review which the administrators would inevitably approve, given the party in question, or to alert an uploading party which is already well aware of the requirement and will only be annoyed by the message.

In the related art, to implement an exception to a constraint for a given party, the system must be re-configured to ignore the constraint when automatically reviewing an application uploaded by the party. Additionally, once the grace period has expired, the exception must be revoked: the system must again be re-configured to apply the constraint normally.

In the related art, such exceptions are requested as a support ticket through suitable project management tools. An administrator manually implements the exception in the system according to the ticket, and will keep the ticket open as a reminder to revoke the exception when the grace period is over.

Such manual administration is error-prone, due to the general fallibility of manual data entry, and also due to the additional possibility of untimely revocation if the task is delayed or forgotten.

Briefly, example embodiments of the present disclosure provide a method and system in which a temporary exception to a constraint is automatically implemented, in a manner such that the exception will also automatically be revoked at its expiration.

Certain embodiments of this preferred solution will be now described in detail.

Figure 1:
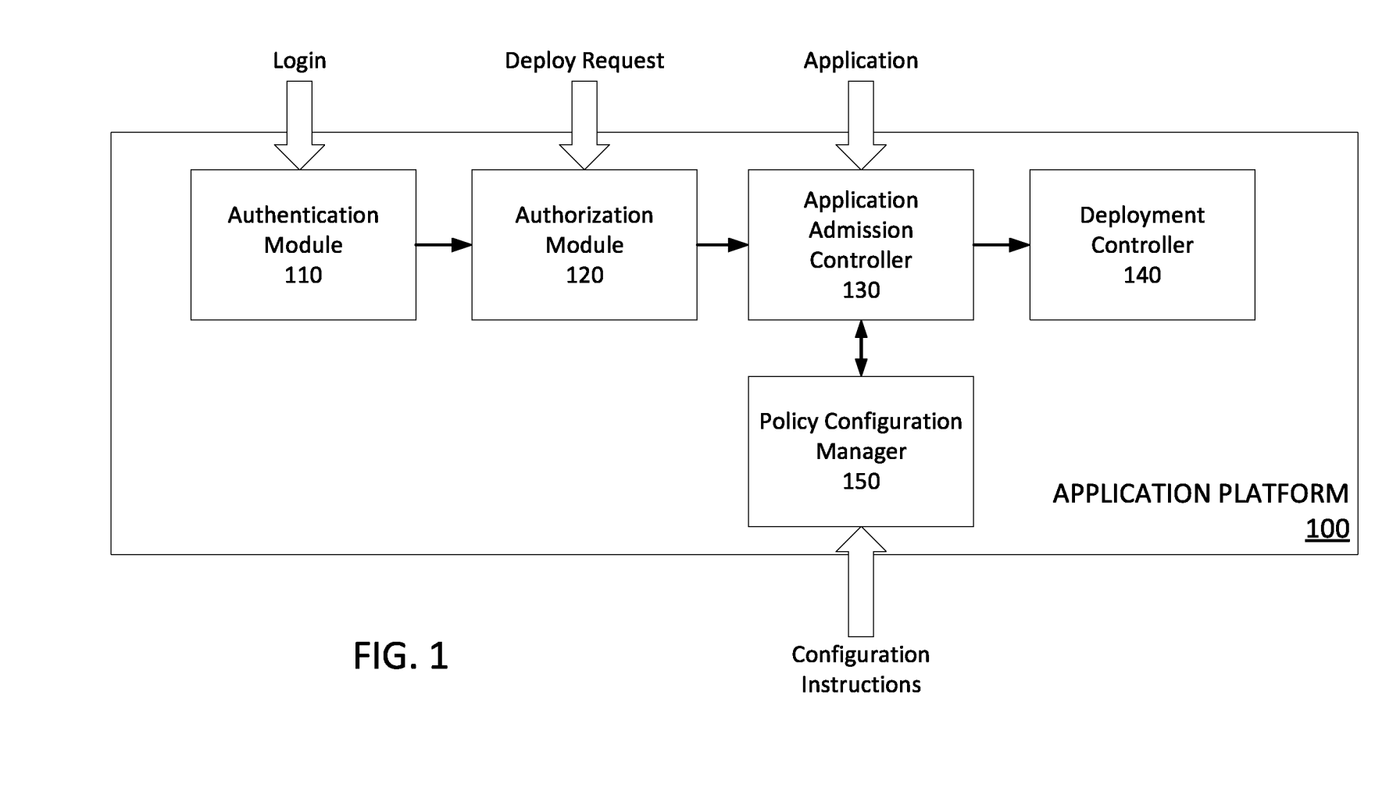
FIG. 1 is a schematic diagram illustrating an application platform including a system for policy-based automated exception handling, in accordance with an exemplary embodiment.

An application platform, including a system for policy-based automated exception handling within, will now be described with reference to FIG. 1, according to an example embodiment.

An application platform 100 may be implemented on a plurality of servers, each having at least one processor, at least one non-volatile memory configured to store computer program code which is executed on the processor, and at least one communication module configured to transmit and receive a signal. The servers are communicatively coupled to each other through their respective communication modules over a network, such as the Internet. It is noted that, due to the nature of cloud computing, any one of these servers may operate according to computer program code in order to operate the processes and components described herein. Indeed, there may be no one server permanently handling any given operation, but such operations can be transferred from server to server.

According to an example embodiment, the application platform 100 includes an authentication module 110, an authorization module 120, an application admission controller 130, and a deployment controller 140.

The authentication module 110 receives a login request (including login credentials) from a user or party, and authenticates the user's login credentials to provide access to the system. If the user then requests to upload and deploy an application onto the platform, the request is received and processed by the authorization module 120, which determines whether the user has permission to do so, and optionally limits the types of applications that a particular user may deploy. If the user is authorized to upload and deploy an application, the application is received as a data object for review by the application admission controller 130.

The application admission controller 130 reviews the application according to its configuration. This review can include one or more tests which are selectively applied according to features of the application and/or the user that requested its deployment. If the application fails a test, the application admission controller 130 selectively executes one of several possible automated responses according to the test and the configuration of the controller 130.

If the application does not fail any of the selectively applied tests, or the application admission controller 130 otherwise does not execute an automated response which cancels deployment of the application, the application is transferred to the deployment controller 140, which manages the deployment of the application through the servers of the platform 100.

According to an example embodiment, the application platform 100 additionally includes a policy configuration manager 150. The policy configuration manager 150 manages security or other policies, and configures the application admission controller 130 to provide the tests and automated responses in accordance with these policies.

Although not limited thereto, an example embodiment exploits the existing functionality of Open Policy Agent (OPA), the specification of which is incorporated herein. OPA is a "gatekeeper" tool for Kubernetes which can be implemented to automatically apply one or more pre-established policies to any object creation request and respond according to the policies.

In an example embodiment, OPA serves as an interface between the policy configuration manager 150 and the application admission controller 130 of the application platform 100; the policy configuration manager 150 generates the instructions which OPA uses to configure the application admission controller 130.

OPA is limited in that it does not have the functionality to apply temporary exceptions to policies. However, OPA permits the implementation of policy logic through constraint template custom resource definitions (CRDs), which can define additional rules for the policy in a schema.

As relevant to this embodiment, OPA defines the complete set of policies for a controller configuration in a single policy definition file, with suitable separators between policies. The policy definition file therefore serves as a configuration file for a controller (for example, for the application admission controller 130 described with reference to FIG. 1).

A template can be provided for each policy to be included in the policy definition file. Each template includes at least part of a definition of the constraint and its parameters in a predefined format. The templates may be implemented and manipulated using any suitable templating engines and tools (e.g., Django, etc.) An example (simplified) format for a policy template, in accordance with the OPA specification format, is shown below:

```
apiVersion: constraints.gatekeepr.sh/v1beta1
kind: PSPAllowedUsers
metadata:
    name: privileged-container
spec:
    enforcementAction: deny
    match:
        kinds:
        - apiGroups: [""]
          kinds ["Pod"]
        namespaces: "security-app,monitoring-app"
```

```
    parameters:
        exceptionList: ""
```

It will be recognized that this template is simplified for brevity and readability, and that in practice, a template and a policy definition which will be generated therefrom might have an extensive set of parameters and other defining values which will describe how the policy definition is to be applied.

In certain embodiments, the template will have an associated policy ID number.

It is noted that this example template includes an exception parameter (e.g., "exceptionList" parameter as shown in above example), which is not part of the standard OPA specification but is a novel addition to the schema. In the template, this parameter is an empty list, empty array, null set, which serves as a placeholder. A parameter value for the exception parameter, which can be an array or list of exception definitions, will be provided during generation of the policy definition file. In certain embodiments, the exception definitions are individually added to the existing (initially empty) array or list during generation of the policy definition file. This list, and therefore the value of the exception parameter, may contain an arbitrary number of exception definitions.

The system automatically exports tickets from the project management tool which relate to exceptions to a constraint, extracts data for each exception, and formats that data into a predefined format for an exception definition. The exception definition defines a set of parameter values for the exception, each of which are to be supplied by the initial support ticket. Project management tools may be configured to require entry of a value for each parameter, or for a required subset of parameters, as part of a support ticket for implementing an exception.

An example format for an exception definition is shown below:

```
[{
    "exceptionId": "EX00001",
    "policies": "1,2,3",
    "startDate": "2022-05-01 13:00:00",
    "expiryDate": "2022-07-01 14:00:00",
    "siteTrustLevel": "High"
},
{
    "exceptionId": "EX00002",
    "policies": "3,4,5",
    "startDate": "2022-05-02 16:30:00",
    "expiryDate": "2022-06-02 17:12:00",
    "siteTrustLevel": "Medium"
}]
```

In the example definition format above, the parameters are as follows:
  "exceptionId" is an identifier for the exception. In this simple example, each exception is identified by the code "EX" followed by a number string.
  "policies" is a list of identifiers for the constraints or policies that the exception applies to. These policies will be selectively ignored or "skipped over" during testing of an application if the present exception applies. In this simple example, each policy is identified by a number, which is the policy ID number associated with the template for the policy. In other embodiments, the full name of the policy is provided in "policies".
  "startDate" defines when the exception is activated, and "expiryDate" defines when it is revoked. Each value can be provided according to any suitable date-time format which will be understood by the system. Additionally, the date-time may be converted between formats for either human or computer readability, such as the format provided above for human viewing, and a Unix timestamp number value in nanoseconds for computer processing.
  Optionally, "siteTrustLevel" defines the types of environments in which the exception applies. A simple implementation of this feature classifies environments into which an application might be deployed according to their trust level, which might be one level of a predefined set of levels such as "Low", "Medium", and "High". For example, a platform accessible to anyone on the web, including malicious (or un-savvy) parties, might have "Low" trust level, while an internal system which can only be accessed by trusted personnel might have "High" trust level. By including this parameter as a threshold value, the exception will only be applied when the deployment request indicates that the application is to be deployed to an environment having at least the indicated trust level, such that "siteTrustLevel: Low" applies the exception for all environments, "siteTrustLevel: Medium" applies the exception for "Medium" and "High" trust environments but applies the constraints normally for "Low" trust environments, and "siteTrustLevel: High" applies the exception only for "High" trust environments. It is noted that embodiments are not limited to "trust levels" as defined above, and that, based on the disclosures herein, other suitable means of classifying environments for application or non-application of an exception can be imagined by those of skill in the art.

Therefore, in the examples provided above, Exception "EX00001" will instruct the system to bypass policies "1", "2", and "3" between May 1, 2022 at 1 pm UTC and Jul. 1, 2022 at 2 pm UTC, but only when deploying to "High" trust level environments. Exception "EX00002" will instruct the system to bypass policies "3", "4", and "5" between May 2, 2022 at 4:30 pm UTC and Jun. 2, 2022 at 5:12 pm UTC, but only when deploying to "Medium" or "High" trust level environments.

It is noted that a permanent exception may be implemented using the same format. A permanent exception can be indicated by omitting a value for expiryDate, providing a null value, or providing an indicator which is explicitly encoded into the system. Alternatively, a permanent exception can be effectively indicated and implemented by providing a value for expiryDate which is sufficiently far into the future as to greatly exceed the expected lifetime of the system.

It is also noted that providing a designated start time is optional. In different embodiments, the system can automatically use, as the start time, the time an exception request was provided, the time the exception was defined, or other times associated with the generation of the exception. In other embodiments, the parameter is not included at all, and an exception is always assumed by the system logic to have already begun its active period.

Once merged with the appropriate exceptions, using a suitable data merger script (such as a Python script), the complete policy definition resulting from the example template and exception definitions above may read as follows:

```
apiVersion: constraints.gatekeepr.sh/v1beta1
kind: PSPAllowedUsers
metadata:
    name: privileged-container
spec:
    enforcementAction: deny
    match:
        kinds:
        - apiGroups: [""]
          kinds ["Pod"]
        namespaces: "security-app,monitoring-app"
    parameters:
        exceptionList:
        - exceptionId: EX00001
          policies: 1,2,3
          startDate: 2022-05-01 13:00:00
          expiryDate: 2022-07-01 14:00:00
          siteTrustLevel: High
        - exceptionId: EX00002
          policies: 3,4,5
          startDate: 2022-05-02 16:30:00
          expiryDate: 2022-06-02 17:12:00
          siteTrustLevel: Medium
```

It is noted that, in this example, the value (list) for the exception parameter will include the definitions of both "EX00001" and "EX00002" only for the policy indicated by the number "3", as only this policy is indicated by both exception definitions. Policies "1" and "2" will include only EX00001's definition, while Policies "4" and "5" will include only EX00002's definition.

A method for configuring an application platform for policy-based automated exception handling will now be described with reference to FIG. 2, according to an embodiment.

At 210, a plurality of policies are established and partially defined. The partial definition of each policy is in the form of a template, and includes a definition of at least one requirement for an application and, in some embodiments, of an automated response to be executed upon failure to fulfill the requirement. The template includes a parameter for a list or array of exception definitions, which has no value or a null value. Certain exemplary requirements and responses have been previously described, although the scope is not limited thereto.

At 220, a plurality of exceptions are established and defined.

More specifically, at 221, an exception request is received and parsed. The exception request may be a ticket from a project management tool, containing values for an exception. These values can include one or more of: policy identifiers which indicate policies to be ignored during testing if the exception applies, a starting time and expiration time for the exception's period of applicability, and a threshold trust level for a deployment environment. These values are then assembled into an exception definition at 223, which is assigned an identifier.

At 230, a policy definition file is automatically generated. This policy definition file may be of the format described above in accordance with the Open Policy Agent (OPA) specification, but is not limited thereto.

More specifically, at 231, an individual policy definition is generated from each policy template. At 233, each exception definition is inserted into the value of the exception parameter, which is a list or array, in the definition of each policy indicated in the exception. At 235, the individual policy definitions are merged into the complete policy definition file.

At 240, the application platform is automatically configured according to the policy definition file, which thereby serves as a configuration file for the platform. More specifically, the application admission controller 130 may be configured by an OPA implementation processing the policy definition file.

Figure 2:
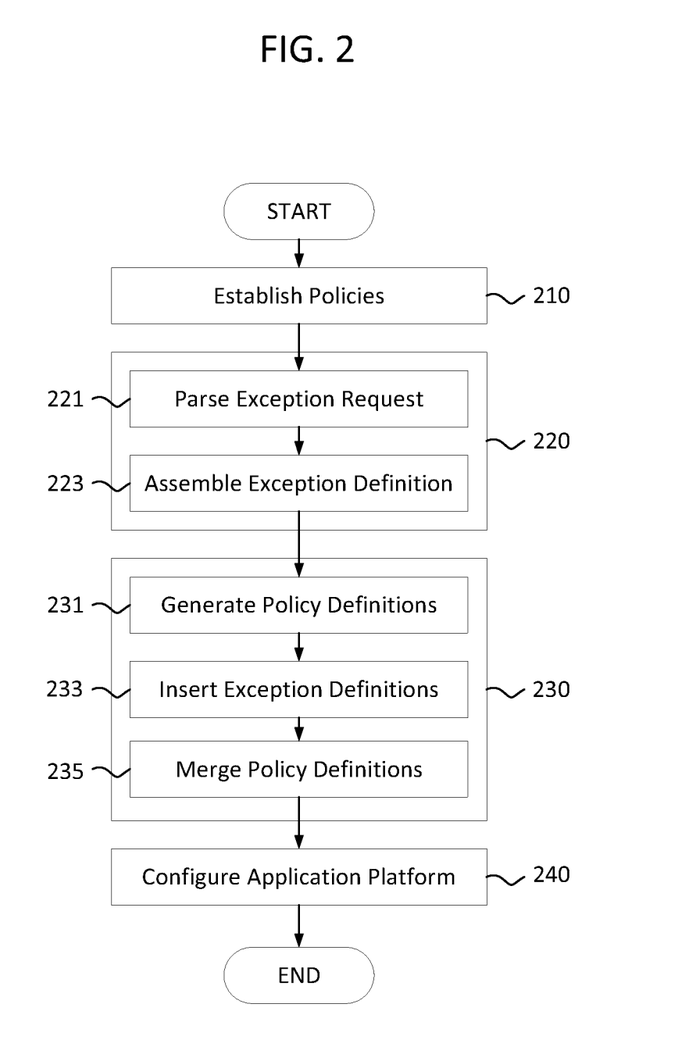
FIG. 2 is a flow diagram illustrating a flow of processes for configuring an application platform for policy-based automated exception handling, in accordance with an exemplary embodiment.

Operations 220 through 240 of the method of FIG. 2 may be repeated periodically to update the configuration. Specifically, operation 220 receives new exceptions as well as reviews the existing set to remove any with an expiration time in the past. Operation 230 then re-generates the policy definition file with the changes to the exceptions properly reflected therein, and operation 240 re-configures the controller to implement the updated policy definition file.

As managed by Open Policy Agent (OPA), each application or data object to be uploaded to the system includes a "manifest" or definition file. In one embodiment, to apply a particular exception to a particular application, the identifier for the exception is included is provided in the "annotations", as follows:

```
apiVersion: v1
kind: Pod
metadata:
    name: nginx
    annotations:
        EID: EX00001
spec:
    containers:
    - name: nginx
      image: nginix
```

By including an "EID" annotation which identifies "EX00001," the manifest indicates that Exception EX00001 is to be applied to the associated data object. Other suitable measures for indicating that an exception applies to a given data object can be imagined by those of skill in the art, and are within the scope of the disclosed systems and methods. If a manifest lacks such an indicator, no exception applies and the application is tested normally.

Figure 3A:
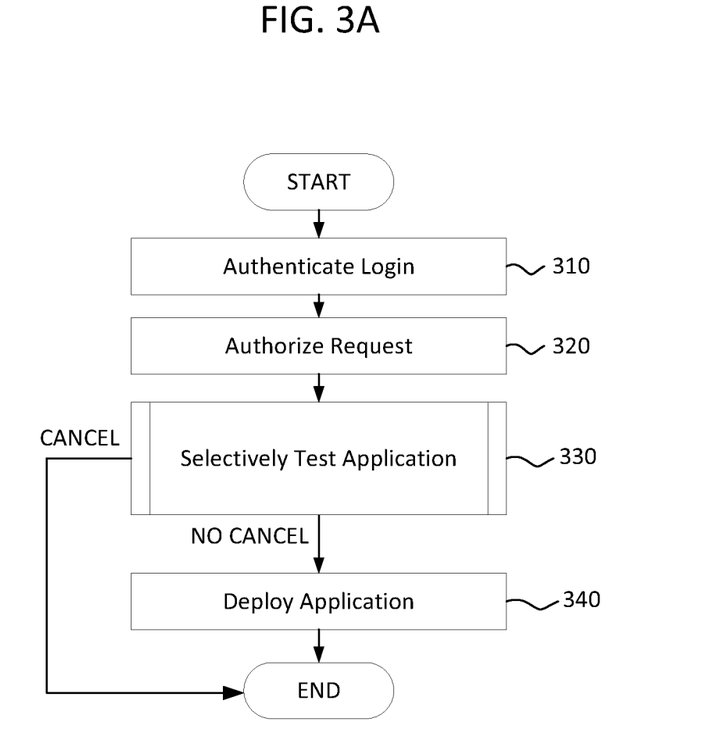
FIG. 3A is a flow diagram illustrating a flow of processes for applying policies during deployment of an application, in accordance with an exemplary embodiment.

A method for applying policies during deployment of an application will now be described with reference to FIG. 3A, according to an example embodiment.

At 310, a login request is received and authenticated, for example by authentication module 110. At 320, a request to upload and deploy an application or other data object onto the platform (e.g., application platform 100) is received and authorized, for example by authorization module 120.

At 330, the application is selectively tested according to a selected set of constraints or policies; for example, tested according to selected portions of a policy definition file. Such testing can be managed, for example, by application admission controller 130.

If the application does not fail any of the selectively applied tests, or the application admission controller 130 otherwise does not execute an automated response which cancels deployment of the application ("NO CANCEL" at 330), then at 340 the application is deployed to an environment indicated by the deployment request, for example by deployment controller 140. Otherwise ("CANCEL" at 330), the method aborts and operation 340 is not performed.

Details of operation 330, which implement automated exception handling during the application of policies, will now be described with reference to FIG. 3B, according to an example embodiment. As noted previously with reference to FIG. 1, in an embodiment, the policy configuration manager 150 configures the application admission controller 130 to perform operation 330, including the implementation of the automated exception handling. In an embodiment, the configuration of the application admission controller 130 to perform this operation is according to the method described with reference to FIG. 2.

At 331, it is checked whether a policy exception is assigned to the application. For example, it is checked whether an Exception ID is listed in the annotations for the manifest of the application. If so ("Y" at 331), the process continues to 332. If not ("N" at 331), the process skips to 335.

At 332, it is checked whether the policy exception assigned to the application is active. For example, the expiryDate and startDate values in the policy exception definition are compared to the current date and time. (In some embodiments, it is assumed that the startDate is prior to the current date and time, and only the expiryDate is checked.) If the expiryDate value is after the current date and time, and if the startDate value is prior to the current date and time, it is determined that the policy exception assigned to the application is active ("Y" at 332), and the process continues to 333. If not ("N" at 332), the process skips to 335.

At 333, it is checked whether the assigned policy exception applies to the intended environment. For example, a siteTrustedLevel value indicated by the policy exception is compared to a trusted level value for a deployment environment indicated by the deployment request. Details of this value and how it is applied have been previously disclosed herein. If the siteTrustedLevel value is "not greater than" a trusted level value associated a deployment environment designated by the deployment request, it is determined that the assigned policy exception applies to the intended environment ("Y" at 333), and the process continues to 334. If not ("N" at 333), the process skips to 335.

At 334, a list of policies is provided and evaluated, and any policies indicated by the policy exception are flagged; as will be seen herein, this flag indicates that the policy is to be ignored during testing, for example the testing described later herein with reference to operation 336.

Figure 3B:
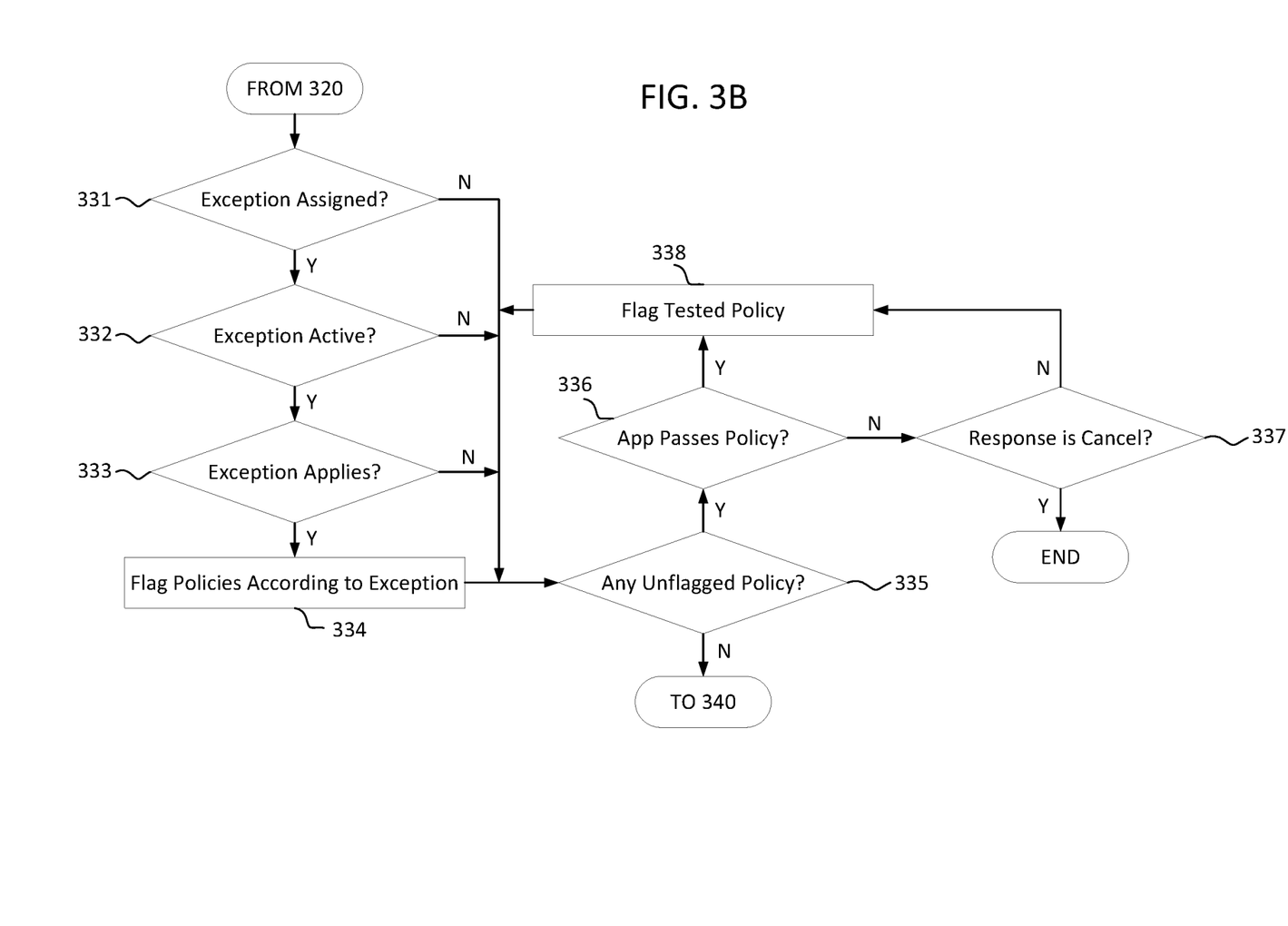
FIG. 3B is a flow diagram illustrating a flow of subprocesses for operation 330 of FIG. 3A, in accordance with an exemplary embodiment.

It is noted that similar operations, not depicted in FIG. 3B, may flag policies as to be ignored according to other logic, including but not limited to a determination that a policy does not apply to a particular application type or to an application having a particular quality.

It is also noted that a "flag" is only an example indicator, and other suitable measures for indicating which policies are to be ignored during testing are within the scope of the disclosed systems and methods. However, for convenience, the terms "flagged" and "unflagged" will be used herein to describe such indications.

At 335, it is checked whether there is an unflagged policy still in the list. If not ("N" at 335), the process skips to 340 and the application is deployed. If so ("Y" at 335), the process continues to 336.

At 336, an unflagged policy in the list is selected and the application is tested against the selected policy. If the application passes ("Y" at 336), the process skips to 338. If it fails ("N" at 336), the process continues to 337.

At 337, it is checked whether an applicable automatic response is to cancel deployment of the application. If so ("Y" at 337), the response is executed by ending the process immediately, bypassing operation 340. If not ("N" at 337), the process continues to 338. It is noted that other automatic responses may be executed at this point, or as part of operation 340, although these particular processes are not depicted in FIGS. 3A and 3B. In some embodiments, the applicable automatic response is determined by the selected policy, which defines said response as part of its policy definition.

At 338, the selected policy, which has now been tested, is flagged, such that it will no longer be considered in testing; that is, a tested policy will not be re-tested in a later iteration of operation 336. The process then returns to 335. It can be seen that, if the selected policy was the only remaining unflagged policy in the list—that is, if all policies in the list have either been ignored by reasons of applicable exception or already tested—operation 335 will then proceed to 340 and the application will be deployed.

A temporary exception will eventually be removed entirely from the policy definition file in at least some embodiments, as part of an automatic re-generation of the policy definition file according to an iteration of the method of FIG. 2 or other methods. However, it is noted that the above method of FIG. 3B, and more particularly operation 332, automatically and immediately makes effective the expiration of a temporary exception, even prior to such re-generation. That is to say, the expiration of a temporary exception does not rely on the good timing of a re-configuration process. This disclosed process is therefore considerably more efficient and precise than manual or even automatic removal of the exception from the policy definition file.

These and related processes, and other necessary instructions, are preferably encoded as executable instructions on one or more non-transitory computer readable media, such as hard disc drives or optical discs, and executed using one or more computer processors, in concert with an operating system or other suitable measures.

In a software implementation, the software includes a plurality of computer executable instructions, to be implemented on a computer system. Prior to loading in a computer system, the software preferably resides as encoded information on a suitable non-transitory computer-readable tangible medium, such as magnetically, optically, or other suitably encoded or recorded media. Specific media can include but are not limited to magnetic floppy disks, magnetic tapes, CD-ROMs, DVD-ROMs, solid-state disks, or flash memory devices, and in certain embodiments take the form of pre-existing data storage (such as "cloud storage") accessible through an operably coupled network means (such as the Internet).

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 4:
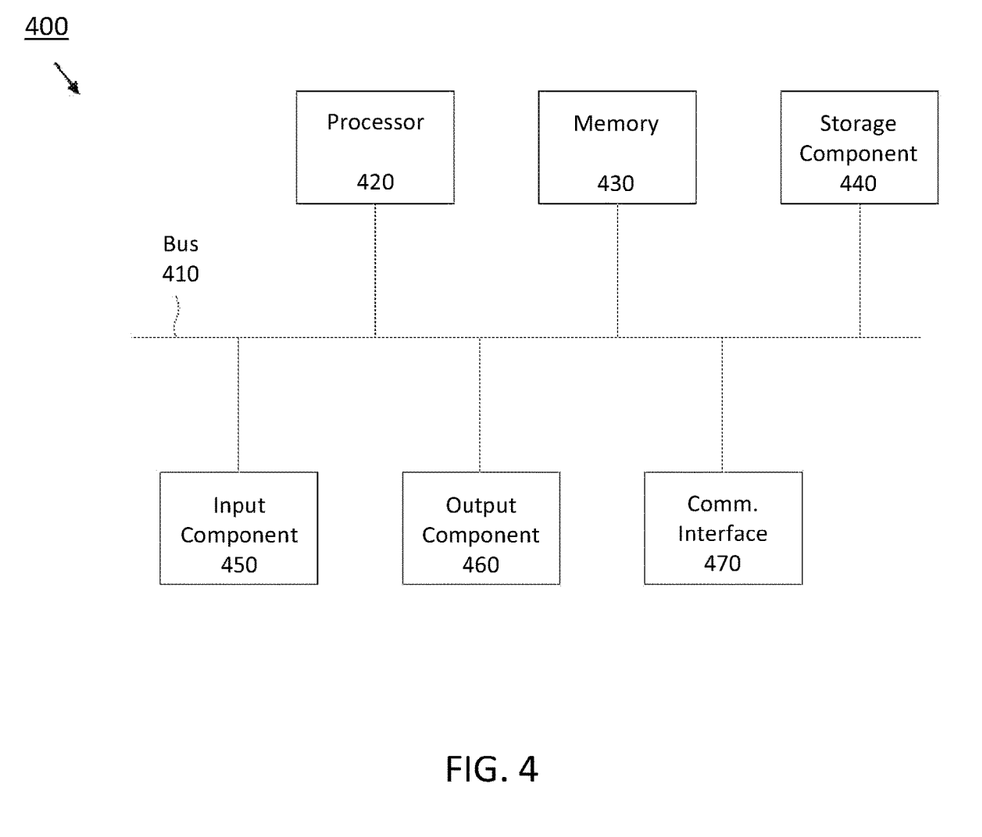
FIG. 4 is a diagram of example components of a device on which embodiments of the systems and/or methods described herein may be implemented.

FIG. 4 is a diagram of components of one or more devices, such as device 400, according to an embodiment. Device 400 may correspond to any computing device described above (such as any server of application platform 100), as well as to a processor executing any described software module (such as authentication module 110, authorization module 120, application admission controller 130, deployment controller 140, and policy configuration manager 150) or method (such as those of FIGS. 2, 3A, and 3B), and to a memory containing any described data storage.

As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component Y50 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device Y00 may perform one or more processes described herein. Device Y00 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for configuring an application platform for policy-based automated exception handling, the method comprising:
    establishing a plurality of policies each to define a requirement for an application;
    establishing, independently of the establishing the plurality of policies, a plurality of exceptions each to define an expiration time and to indicate at least one policy of the plurality of policies;
    by a processor, automatically generating a configuration file associating each exception of the plurality of exceptions with each policy indicated in the exception, the automatically generating being performed by associating an established exception with plural established policies based on the plural established policies being indicated in the established exception;
    by the processor, automatically configuring the application platform according to the configuration file, such that an admission controller of the application platform:
        selectively tests an application designated for deployment to the application platform and having an exception assigned thereto, based on a determination whether the assigned exception is presently applicable to the policy, the testing being to determine whether the application meets a requirement defined by a policy in the configuration file, and
        selectively executes an automated response based on a failure of the application to fulfill the requirement upon testing,
    wherein an exception is determined to be presently applicable to the policy based on:
        an association of the exception with the policy in the configuration file, and
        a comparison of a present time with the expiration time defined in the exception.

2. The method of claim 1, wherein the automated response is an automatic cancellation of deployment of the application.

3. The method of claim 1, wherein the automated response is defined by the policy.

4. The method of claim 1, wherein:
each exception further indicates a threshold trust level of a predefined set of trust levels,
an application is designated for deployment to a specified environment within the application platform, and
an exception is determined to be presently applicable to the policy further based on a comparison of the threshold trust level indicated by the exception with a trust level associated with the specified environment.

5. A non-transitory computer-readable recording medium having recorded thereon instructions executable by at least one processor to perform a method for configuring an application platform for policy-based automated exception handling, the method comprising:
establishing a plurality of policies each to define a requirement for an application;
establishing, independently of the establishing the plurality of policies, a plurality of exceptions each to define an expiration time and to indicate at least one policy of the plurality of policies;
by a processor, automatically generating a configuration file associating each exception of the plurality of exceptions with each policy indicated in the exception, the automatically generating being performed by associating an established exception with plural established policies based on the plural established policy policies being indicated in the established exception;
by the processor, automatically configuring the application platform according to the configuration file, such that an admission controller of the application platform:
selectively tests an application designated for deployment to the application platform and having an exception assigned thereto, based on a determination whether the assigned exception is presently applicable to the policy, the testing being to determine whether the application meets a requirement defined by a policy in the configuration file, and
selectively executes an automated response based on a failure of the application to fulfill the requirement upon testing,
wherein an exception is determined to be presently applicable to the policy based on:
an association of the exception with the policy in the configuration file, and
a comparison of a present time with the expiration time defined in the exception.

6. The recording medium of claim 5, wherein the automated response is an automatic cancellation of deployment of the application.

7. The recording medium of claim 5, wherein the automated response is defined by the policy.

8. The recording medium of claim 5, wherein:
each exception further indicates a threshold trust level of a predefined set of trust levels,
an application is designated for deployment to a specified environment within the application platform, and
an exception is determined to be presently applicable to the policy further based on a comparison of the threshold trust level indicated by the exception with a trust level associated with the specified environment.

9. An electronic device comprising:
at least one memory configured to store computer program code;
at least one processor configured to operate as instructed by the computer program code, the computer program code including:
policy code configured to cause at least one of the at least one processor to establish a plurality of policies each to define a requirement for an application,
exception code configured to cause at least one of the at least one processor to establish, independently of the established plurality of policies, a plurality of exceptions each to define an expiration time and to indicate at least one policy of the plurality of policies,
generation code configured to cause at least one of the at least one processor to automatically generate a configuration file associating each exception of the plurality of exceptions with each policy indicated in the exception, the automatically generating being performed by associating an established exception with plural established policies based on the plural established policies being indicated in the established exception, and
configuration code configured to cause at least one of the at least one processor to automatically configure the application platform according to the configuration file, such that an admission controller of the application platform:
selectively tests an application designated for deployment to the application platform and having an exception assigned thereto, based on a determination whether the assigned exception is presently applicable to the policy, the testing being to determine whether the application meets a requirement defined by a policy in the configuration file, and
selectively executes an automated response based on a failure of the application to fulfill the requirement upon testing,
wherein an exception is determined to be presently applicable to the policy based on:
an association of the exception with the policy in the configuration file, and
a comparison of a present time with the expiration time defined in the exception.

10. The electronic device of claim 9, wherein the automated response is an automatic cancellation of deployment of the application.

11. The electronic device of claim 9, wherein the automated response is defined by the policy.

12. The electronic device of claim 9, wherein:
each exception further indicates a threshold trust level of a predefined set of trust levels,
an application is designated for deployment to a specified environment within the application platform, and
an exception is determined to be presently applicable to the policy further based on a comparison of the threshold trust level indicated by the exception with a trust level associated with the specified environment.

13. The method of claim 1, wherein the admission controller selectively tests the application based on a determination that the exception is assigned to the application according to information included with the application that indicates the exception.

14. The method of claim 13, wherein the information is a manifest or definition file of the application.

15. The method of claim 1, wherein the automatically generated configuration file comprises a plurality of policy definitions respectively corresponding to the plurality of established policies, wherein each of the plurality of policy definitions includes a listing of one or more exceptions, among the established plurality of exceptions, applicable to that policy.

16. The method of claim 15, wherein a first policy definition, among the plurality of policy definitions, includes a first plurality of exceptions applicable to that policy.

17. The method of claim 16, wherein a second policy definition, among the plurality of policy definitions, includes a first exception among the first plurality of exceptions included in the first policy definition.

* * * * *